United States Patent
Spick et al.

(10) Patent No.: US 10,696,275 B2
(45) Date of Patent: Jun. 30, 2020

(54) METHOD FOR ACTIVATING A FUNCTION OF A VEHICLE

(71) Applicants: Continental Automotive France, Toulouse (FR); Continental Automotive GmbH, Hannover (DE)

(72) Inventors: Gabriel Spick, Toulouse (FR); Bertrand Vaysse, Tournefeuille (FR); Maxime Micheau, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/482,776

(22) PCT Filed: Mar. 14, 2018

(86) PCT No.: PCT/FR2018/050609
§ 371 (c)(1),
(2) Date: Aug. 1, 2019

(87) PCT Pub. No.: WO2018/178533
PCT Pub. Date: Oct. 4, 2018

(65) Prior Publication Data
US 2020/0010050 A1    Jan. 9, 2020

(30) Foreign Application Priority Data
Mar. 28, 2017  (FR) ...................... 17 52587

(51) Int. Cl.
*B60R 25/24* (2013.01)
*G01S 11/02* (2010.01)
(Continued)

(52) U.S. Cl.
CPC ............ *B60R 25/245* (2013.01); *E05F 15/00* (2013.01); *G01S 11/02* (2013.01);
(Continued)

(58) Field of Classification Search
CPC .............. B60R 25/245; G07C 9/00571; G07C 9/00309; G07C 2209/65;
(Continued)

(56) References Cited

U.S. PATENT DOCUMENTS 7,705,710 B2 * 4/2010 Hermann ................ B60R 25/24
340/426.11
8,077,011 B2 * 12/2011 McBride ............... B60R 25/245
340/10.1
(Continued)

FOREIGN PATENT DOCUMENTS

DE    102014119401 A1    6/2016

OTHER PUBLICATIONS

International Search Report and Written Opinion for International Application No. PCT/FR2018/050609, dated Jun. 15, 2018—9 pages.
(Continued)

*Primary Examiner* — Nam V Nguyen
(74) *Attorney, Agent, or Firm* — RatnerPrestia (57) ABSTRACT

A method for activating a function of a vehicle from a portable access device borne by a user. The method includes measurement of the received signal strength of signals exchanged between the access device and transceiver modules installed in the vehicle, detection of human presence, determination of the position of the access device from the signal strength measurements, and activation of a function of the vehicle when human presence has been detected and the position of the authenticated access device is determined as being within a predetermined proximity zone around the vehicle.

11 Claims, 3 Drawing Sheets

(51) Int. Cl.
*G07C 9/00* (2020.01)
*E05F 15/00* (2015.01)

(52) U.S. Cl.
CPC ..... *G07C 9/00309* (2013.01); *G07C 9/00571* (2013.01); *G07C 2009/00769* (2013.01); *G07C 2209/65* (2013.01)

(58) Field of Classification Search
CPC ...... G07C 2009/00769; G07C 2209/63; G01S 11/02; G01S 11/06
USPC ............ 340/5.61, 5.6, 12.5, 5.72; 455/42.1; 701/2, 36, 207
See application file for complete search history.

(56) References Cited

U.S. PATENT DOCUMENTS

| | | | |
|---|---|---|---|
| 8,744,482 B2* | 6/2014 | Margalef | G01S 5/0252 340/5.61 |
| 9,008,917 B2* | 4/2015 | Gautama | B60W 10/08 701/48 |
| 9,214,083 B2* | 12/2015 | Lim | G08C 17/02 |
| 9,467,817 B1* | 10/2016 | Van Wiemeersch | H04W 4/029 |
| 9,751,497 B2* | 9/2017 | Sanji | G06K 9/00791 |
| 10,053,903 B2* | 8/2018 | Ette | E05F 15/73 |
| 10,380,817 B2* | 8/2019 | Kim | E05B 81/78 |
| 10,501,052 B2* | 12/2019 | Schindler | G01S 17/08 |
| 2010/0076622 A1* | 3/2010 | Dickerhoof | B60R 25/24 701/2 |
| 2011/0102139 A1* | 5/2011 | Girard, III | H04L 9/3271 340/5.61 |
| 2014/0188309 A1 | 7/2014 | Caratto et al. | |
| 2017/0018128 A1 | 1/2017 | Berezin et al. | |
| 2019/0287329 A1* | 9/2019 | Jonsson | G07C 9/00309 |

OTHER PUBLICATIONS

English Translation of the Written Opinion for International Application No. PCT/FR2018/050609, dated Jun. 15, 2018, 7 pages.

* cited by examiner

METHOD FOR ACTIVATING A FUNCTION OF A VEHICLE

CROSS REFERENCE TO RELATED APPLICATIONS

This application is the U.S. National Phase Application of PCT International Application No. PCT/FR2018/050609, filed Mar. 14, 2018, which claims priority to French Patent Application No. 1752587, filed Mar. 28, 2017, the contents of such applications being incorporated by reference herein.

FIELD OF THE INVENTION

The present invention pertains to the motor vehicle sector and relates more particularly to a method for activating a function of a motor vehicle. The invention applies in particular to the function of locking and unlocking the opening elements of a motor vehicle.

BACKGROUND OF THE INVENTION

In a motor vehicle, it is known to use presence detection devices for detecting the presence of a hand or of a foot of a user of the vehicle and thus to allow all or some of the opening elements of the vehicle, for example the doors or the trunk, to be locked or unlocked. By way of example, the detection of the presence of a hand of a user on or in front of a door handle in conjunction with the recognition of an identifier of a "hands-free" access device carried by this user allows these opening elements to be locked and unlocked.

To achieve this, when the user approaches the vehicle, communication is established over a wireless communication link between the access device, for example an electronic fob or a mobile telephone, and the detection device in order to authenticate said detection device by virtue of its identifier.

To this end, the detection device includes an antenna allowing the identifier sent by the access device to be received. The detection device is connected to an electronic computer of the vehicle (ECU: abbreviation for "electronic control unit") to which it transmits the identifier.

According to the prior art, the access device is generally an electronic fob. The signal received by the antenna of the detection device, comprising the identifier of the access device, is transmitted via RF (radiofrequency) or LF (low-frequency) waves.

Nowadays, however, it is increasingly common to use a mobile telephone to perform authentication functions, which makes it possible to avoid using a dedicated electronic fob and thus to limit the number of devices. Since the majority of mobile telephones do not have RF or LF communication means, it is known to use the Bluetooth® communication module, with which the majority of existing telephones are equipped, to send the identifier of the device in the case of a function of unlocking a vehicle.

Once the identifier has been received by the computer, said computer allows the access device to be recognized for the purpose of unlocking the vehicle only when the access device is situated close to the vehicle, for example less than one meter away.

It is known to determine this geographical proximity by determining the position of the access device in relation to the vehicle through triangulation. In one existing solution, the vehicle comprises three or four Bluetooth® antennas for receiving the signal, transmitted by access device, the signal strength of the received signal varying depending on the distance between the access device and each Bluetooth® antenna. The reception of the signal by all of the Bluetooth® antennas thus makes it possible, through triangulation, to determine the position of the access device in relation to the vehicle.

When the access device is located in what is known as a "proximity" zone by the computer, said computer allows the opening elements to be unlocked only when the carrier of the authorized access device places his hand on or close to a detection device installed in the vehicle, for example in a door handle.

To detect the presence of the hand of the user and to allow the opening elements of the vehicle to be unlocked, such a detection device comprises, in a known manner, a capacitive sensor.

According to one example of capacitive measurement, such a capacitive sensor comprises a first capacitor that is charged and discharged periodically from/into a second capacitor. When the first capacitor discharges into the second capacitor, the charges are balanced between the two capacitors.

When a hand is present on the handle or close to the handle, for example less than 10 mm away, the level of charge of the first capacitor increases. This results in a larger discharge of the first capacitor into the second capacitor, and therefore a higher level of balancing in the presence than in the absence of a hand on the handle. Such a sensor thus makes it possible to detect the intention of a user to unlock the opening elements of the vehicle.

However, it turns out that the presence of a hand on or close to the detection device influences the Bluetooth® antenna of said detection device. Specifically, in such a case, the hand of the user absorbs some of the waves exchanged between the detection device and the access device. The Bluetooth® antenna of the detection device then receives, from the access device, a signal whose measured signal strength value is reduced by the presence of the hand. The use of this incorrect value by the computer may lead to an error in the triangulation calculations. In particular, the access device may be detected in a position that is too far from the vehicle, for which the computer does not allow the opening elements to be unlocked even though it should, this constituting a major drawback.

SUMMARY OF THE INVENTION

The aim of an aspect of the invention is therefore to rectify this drawback by proposing a simple, reliable, effective and inexpensive solution for limiting or even eliminating the risks of errors in the determination of the position of the access device in relation to the vehicle. The aim of an aspect of the invention is in particular to ensure that the computer authorizes the unlocking of the opening elements when an authenticated user is effectively situated close to the detection device.

To this end, an aspect of the invention relates first of all to a method for activating a function of a vehicle from a portable access device borne by a user, said vehicle comprising a plurality of detection devices, each detection device comprising a presence detector and an associated transceiver module able to communicate with the access device over an ultra-high-frequency communication link, said transceiver module being electrically connected to an on-board computer in the vehicle.

Said method comprises a step of authentication of the access device by the vehicle, a step of measurement of the received signal strength of signals exchanged between the access device and the transceiver modules, a step of detection, by one of the detectors, of human presence, the transceiver module associated with said detector then being called "main module" and the other transceiver modules being called "secondary modules", a step of sending, to the computer, by the detection device comprising the main module, of a human presence detection message, a step of sending, to the computer, by each detection device comprising a secondary module, of the signal strength measurement performed between the access device and said secondary module, a step of reception, by the computer, of the signal strength measurements sent by the secondary modules and of the human presence detection message, a step of determination, by the computer, of the position of the access device from the received signal strength measurements, and a step of activation of a function of the vehicle when the computer has received the detection message and the position of the authenticated access device is determined as being in a predetermined proximity zone around the vehicle.

Said method is noteworthy in that the signal strength measurement performed between the access device and the main module is either compensated or ignored.

Such a method advantageously makes it possible to ensure detection of the intention of a user to activate a function of the vehicle by limiting, or even eliminating, the risks of errors linked to the determination of the position of the access device when said access device is effectively situated close to the vehicle.

The term "ultra-high-frequency" (UHF) is understood to mean a frequency or a frequency band in the interval [1100 MHz; 3 GHz]. The term "detection of human presence by one of the detectors" is understood to mean the detection of human presence by said detector close to the detection device in which it is installed. Lastly, the term "position of the access device" is understood to mean that the access device is determined or not determined within the predetermined proximity zone; the position may thus include a distance measurement or a location.

The signal strength measurement performed between the access device and the main module may be either compensated or ignored. When it is ignored, the measurement may not be sent to the computer by the detection device comprising the main module, or else be sent by the main module but be ignored by the computer in the determination of the position of the access device. Ignoring the measurement is a simple means for avoiding an incorrect calculation of the position of the access device due to human presence close to one of the detection devices. Compensating the attenuated signal strength measurement will make it possible to improve the accuracy of the determination of the position of the access device.

In the case of compensation of the signal strength measurement, in a first embodiment, the method furthermore comprises a step of calculation, by the main module, of a compensated signal strength value from the signal strength measurement performed between the access device and said main module, and a step of sending, to the computer, by the detection device comprising the main module, of said compensated value, the computer then using this compensated value and the measurements received from the secondary modules to determine the position of the access device.

In a second embodiment, the method comprises a step of sending, to the computer, by the detection device comprising the main module, of the signal strength measurement that is performed and, when the computer has received the detection message, a step of calculation, by the computer, of a compensated signal strength value based on the signal strength measurement received from the main module, the computer then using this compensated value and the measurements received from the secondary modules to determine the position of the access device.

According to one aspect of the invention, the compensated value corresponds to the sum of the signal strength measurement performed between the access device and the main module and a predetermined value.

In one embodiment, the signal strength measurements are performed by the access device. In this case, the main module may insert, into a message intended for the access device, an item of information indicating that it has detected human presence, and an identifier of said main module such that the access device identifies the attenuated signal and sends the signal strength measurement of said attenuated signal with the identifier of the main module in order to calculate its position.

In another embodiment, the signal strength measurements are performed by the transceiver modules so as to simplify the software architecture of the access device and reduce the amount of information exchanged between the access device and the vehicle.

According to one feature of an aspect of the invention, the measurements that are performed are RSSI (received signal strength indication) measurements, such measurements being easy to perform.

Advantageously, the position of the access device is determined through triangulation using the signal strength measurements received by the computer, such triangulation being both easy to perform and accurate.

According to another feature of an aspect of the invention, the access device communicates with each of the transceiver modules over a Bluetooth® communication link, preferably in the frequency band between 2.4 and 2.48 GHz, advantageously then making it possible to implement the method when the access device is a mobile telephone equipped with a Bluetooth® or Bluetooth® Low Energy communication module.

Preferably, the function to be activated concerns the locking or the unlocking of the vehicle.

An aspect of the invention also relates to a motor vehicle comprising:
  a plurality of detection devices, each detection device comprising a presence detector and an associated transceiver module able to communicate over an ultra-high-frequency communication link with an access device associated with the vehicle and borne by a user, said transceiver module being able to measure or to receive a received signal strength measurement of signals exchanged between said access device and said transceiver module, the transceiver module associated with a presence detector detecting human presence then being called "main module" and the other transceiver modules being called "secondary modules", said detection device being electrically connected to at least one on-board computer in the vehicle and being able to send a presence detection message to said computer, and
  at least one computer electrically connected to the plurality of detection devices and able to:
    authenticate the access device,
    receive a detection message from one of the detection devices,
    receive signal strength measurements sent by the transceiver modules,
    determine the position of the access device from the received signal strength measurements, activate a function of the vehicle following the reception of a detection message and when the position of the authenticated access device is determined as being within a predetermined proximity zone around the vehicle, said vehicle being noteworthy in that one or the other of the main module or the computer is able to compensate or to ignore the signal strength measurement performed between the access device and the main module.

Preferably, the presence detector of each detection device is installed at least partly in a handle of an opening element of the vehicle and is able to detect human presence close to said opening element.

An aspect of the invention also relates to a system for activating a function of a vehicle, comprising a vehicle as presented above and an access device borne by a user of the vehicle, able to authenticate itself with said vehicle and to communicate with the transceiver modules of the detection devices over an ultra-high-frequency communication link.

In one embodiment, the access device is able to measure the received signal strength of signals exchanged with each of the transceiver modules.

BRIEF DESCRIPTION OF THE DRAWINGS

Other features and advantages of aspects of the invention will become apparent from the following description, given with reference to the appended figures that are given by way of non-limiting example and in which identical references are given to similar objects.

DETAILED DESCRIPTION OF THE PREFERRED EMBODIMENTS

The system and the method according to an aspect of the invention are presented hereinafter for the purpose of implementation in a motor vehicle. However, any implementation in a different context, in particular for any vehicle comprising a function able to be activated through evaluation of a position based on a signal strength value of a received signal is also targeted by an aspect of the invention.

In addition, the system and the method according to an aspect of the invention are described hereinafter according to an exemplary embodiment in which the activated function corresponds to the unlocking of the opening elements of a motor vehicle, without this application limiting the scope of an aspect of the present invention.

Figure 1:
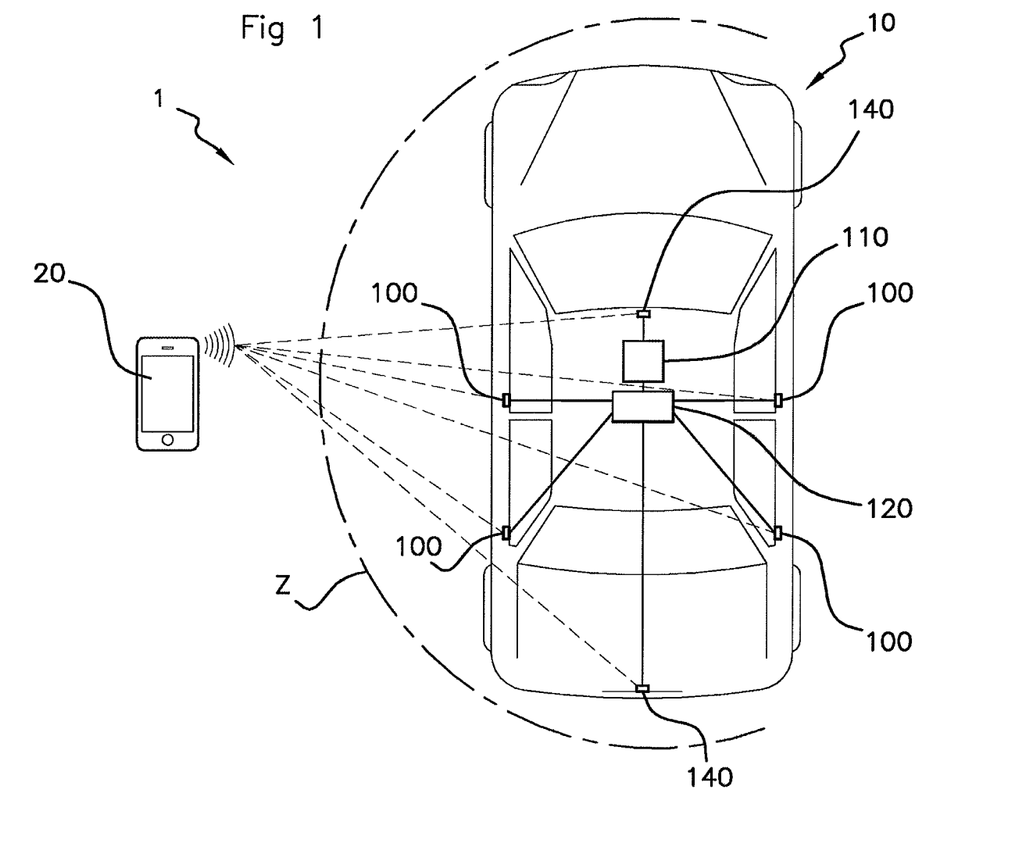
FIG. 1 schematically illustrates one embodiment of the system according to an aspect of the invention.

With reference to FIG. 1, the system 1 comprises a motor vehicle 10 and an access device 20.

The vehicle 10 comprises a plurality of detection devices 100, a first computer called "main computer" 110 and a second computer, called dedicated computer 120.

In the embodiment illustrated in FIG. 1, the vehicle 10 comprises four detection devices 100, each installed at least partly in a door handle of the vehicle 10.

Figure 2:
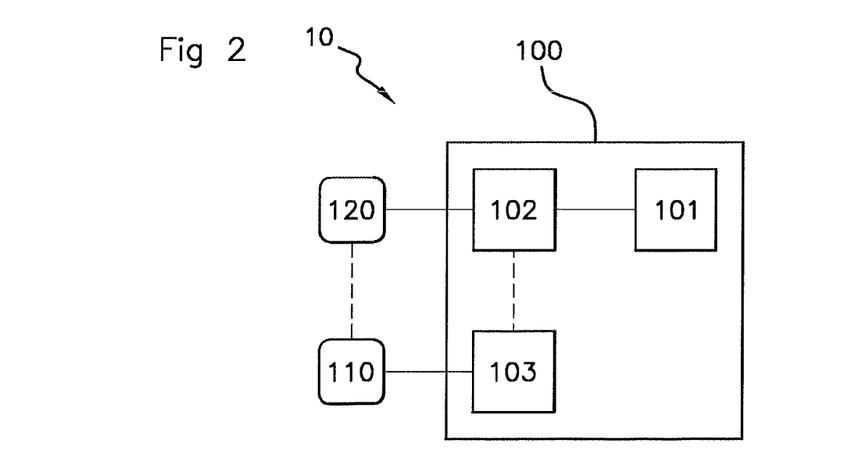
FIG. 2 is a partial schematic view of the system of FIG. 1, detailing one of the detection devices of said system.

As illustrated in FIG. 2, each detection device 100 comprises an antenna 101, a transceiver module 102 and a presence detector 103. Preferably and in the example described hereinafter, the antenna 101 is a Bluetooth® transceiver antenna, but may be any ultra-high-frequency antenna operating in the 300 MHz-3 GHz band.

Figure 3:
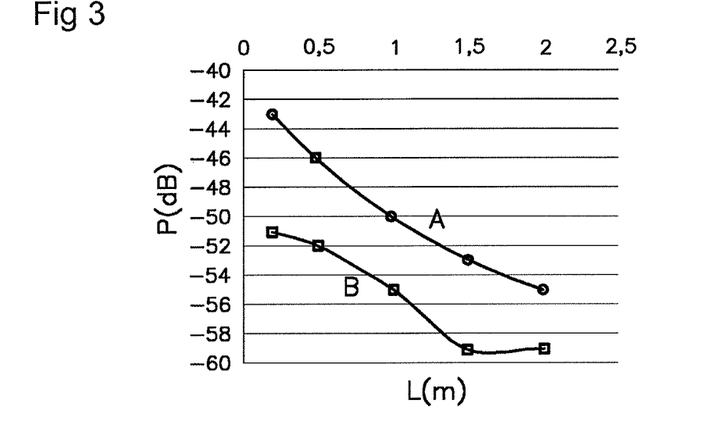
FIG. 3 illustrates a graph of an example of the measurement of the signal strength of a signal received by a transceiver module in the presence or in the absence of a human hand nearby.

The antenna 101 makes it possible to exchange signals with the access device 20. The signal strength of the signals exchanged between the access device 20 and the antenna 101 varies depending on the distance between the access device 20 and the detection device 100. A measurement of this signal strength, known under the name RSSI (for received signal strength indication), known per se, may be performed on reception by the detection device 100 or by the access device 20. When human presence is situated in the immediate proximity of or in contact with a detection device 100, the signal strength of the signals exchanged between the access device 20 and said detection device 100 is reduced thereby. As is shown on the graph of FIG. 3, the signal strength P value of a signal received by a detection device 100 with (A) and without (B) presence of a hand close to the door is different. FIG. 3 shows an example in which the presence of a hand (B) leads to a drop of around 8 decibels (dB) in the signal strength P value of the signal for any distance between 0 and 2.5 m between the detection device and the access device.

The transceiver module 102 makes it possible to generate signals to be transmitted via the antenna 101 or to process the signals received by the antenna 101. The transceiver module 102 may take the form of a microcontroller.

Figure 4:
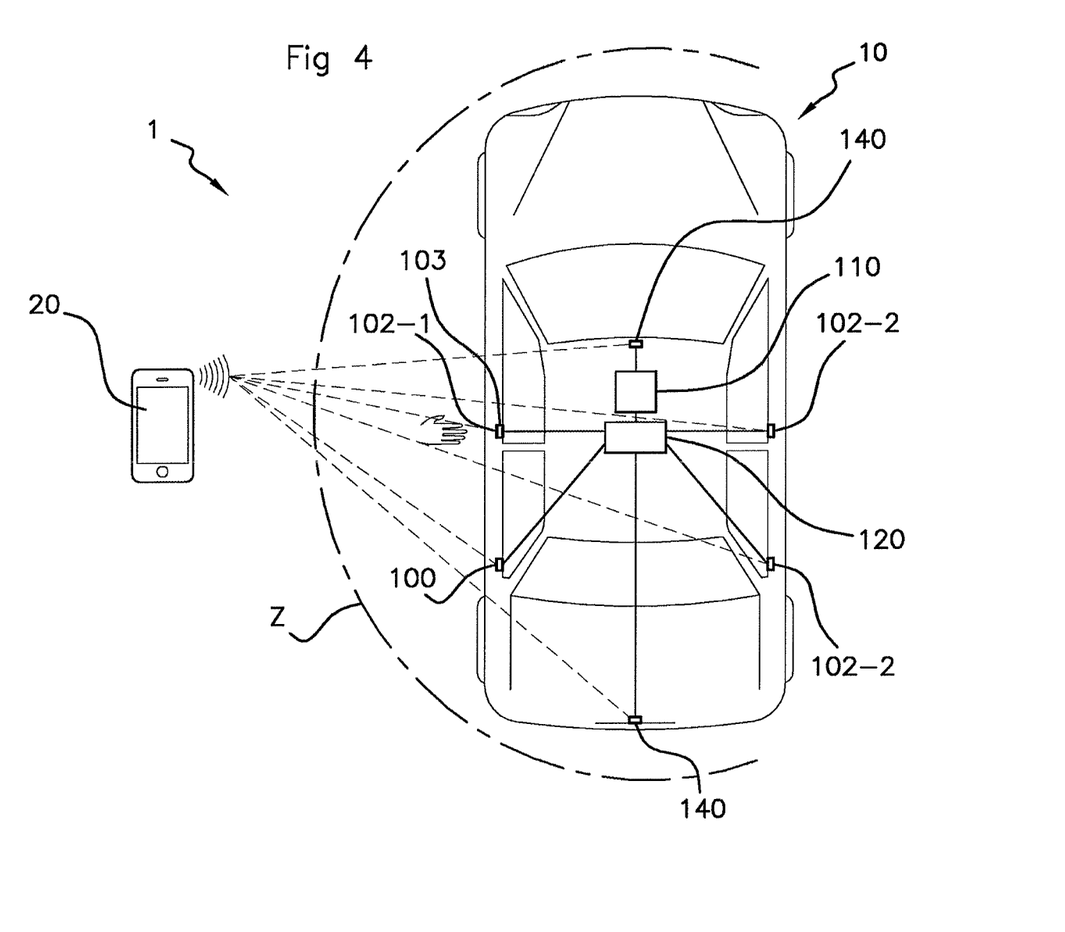
FIG. 4 schematically illustrates an example of an approach of a hand close to a door of the vehicle, the vehicle then comprising a main module and three secondary modules.

With reference to FIG. 4, when the detector 103 of one of the detection devices 100 detects human presence close to said detection device 100 (as will be described hereinafter), the transceiver module 102 associated with said detector 103 (i.e. of the same detection device 100) is denoted "main module" 102-1. Similarly, all of the transceiver modules 102 of the other detection devices 100 (i.e. which have not detected human presence) are denoted secondary modules 102-2. The main module 102-1 thus exchanges an attenuated signal with the access device 20, whereas the secondary modules 102-2 exchange unattenuated signals with the access device 20.

In one embodiment, the main module 102-1 is configured so as to compensate the value of the received signal strength P so as to transmit, to the dedicated computer 120, a compensated signal strength value $P_C$ of the received signal. Such compensation of the signal will be described in more detail later on.

In another embodiment, the measurement performed by the main module 102-1 is simply ignored in the calculation for determining the position of the access device 20.

In the non-limiting embodiment illustrated in FIG. 1, the vehicle 10 furthermore comprises two communication devices 140, one installed in the handle of the trunk and the other in the front console of the vehicle 10, each comprising a transceiver module and an antenna (which are not shown) that are used to exchange signals with the access device 20, these signals also being able to be used to determine the position of the access device 23 through triangulation.

The presence detector 103 makes it possible to detect human presence close to the vehicle 10. To this end, the presence detector 103 comprises, in this example, a sensor (not shown), denoted capacitive sensor, for providing a voltage signal representative of the absence or of the presence of a hand, for example less than 10 millimeters away from a handle of a door or of the trunk of the vehicle 10. To this end, this capacitive sensor comprises a first capacitor, called "reference" capacitor, and a second capacitor, called "storage" capacitor. During operation of the sensor, said sensor is configured so as to periodically charge the reference capacitor to its maximum level of charge, and then to discharge it into the storage capacitor such that the two capacitors balance. The sensor then makes it possible to measure the voltage across the terminals of the storage capacitor, and to discharge the two capacitors before starting again. The voltage measured at the output of the capacitive sensor then represents, in this example, the voltage measured across the terminals of the storage capacitor. In the absence of a hand on the handle, the value of the voltage measured by the sensor is substantially constant. When a hand approaches the handle, the maximum level of charge of the reference capacitor increases. The level of balancing between the two capacitors, resulting from the reference capacitor discharging into the storage capacitor, in turn increases. This results in a higher voltage measurement across the terminals of the storage capacitor. When the difference from a previous voltage measurement is great enough, such a capacitive sensor makes it possible to detect the presence or the approach of a hand on or toward the handle of the opening element of the vehicle 10.

In this preferred example, the main computer 110 is configured so as to control the unlocking of the opening elements of the vehicle 10 when it receives an unlock message from the dedicated computer 120.

The dedicated computer 120 is configured so as to receive a plurality of items of information from the detection devices 100 and to transmit them to the main computer 110. It will however be noted that the functions of the dedicated computer 120 could very well also be performed directly by the main computer 110, without this limiting the scope of an aspect of the present invention.

The dedicated computer 120 is dedicated to the communication functions of the vehicle 10 and connected at the same time to the four detection devices 100 and to the two communication devices 140 so as to determine the position of the access device 20 in relation to the vehicle 10.

The signal strength measurements of the signals exchanged between the access device 20 and each of the transceiver modules 102 are transmitted to the dedicated computer 120.

The dedicated computer 120 is configured so as to determine the position of the access device 20 in relation to the vehicle 10. This determination is preferably performed through triangulation, using the received signal strength measurements. As such triangulation calculations are well known, they will not be described here.

The dedicated computer 120 is configured so as to determine whether the access device 20 is positioned within a predetermined proximity zone Z situated around the vehicle 10, for example less than one meter away.

When the dedicated computer 120 determines that the access device 20 is within the predetermined proximity zone Z and that one of the detection devices 100 has detected the presence of a hand on or close to the handle in which it is installed, the dedicated computer 120 is configured so as to send an unlock message to the main computer 110.

The access device 20 is able to communicate bidirectionally with each of the detection devices 100 over an ultra-high-frequency communication link (300 MHz-3 GHz), preferably Bluetooth® (2.4-2.48 GHz).

Thus, the access device 20 is preferably equipped with a Bluetooth® communication module so as to allow an exchange of data with the detection devices 100 of the vehicle 10.

Preferably, the access device 20 takes the form of a mobile telephone equipped with a Bluetooth® module, making it possible to avoid using a dedicated electronic fob-type device and to thus limit the number of devices of the user.

The access device 20 is associated with an identifier, allowing it to be identified by and authenticated with one of the computers 110, 120 of the vehicle 10. In other words, the vehicle 10 is configured so as to recognize and to be recognized by the access device 20, which is specific to the user of the vehicle 10. To this end, the access device 20 is configured so as to transmit a signal comprising its identifier to one of the detection devices 100. As such authentication is known per se, it will not be described in more detail here.

Figure 5:
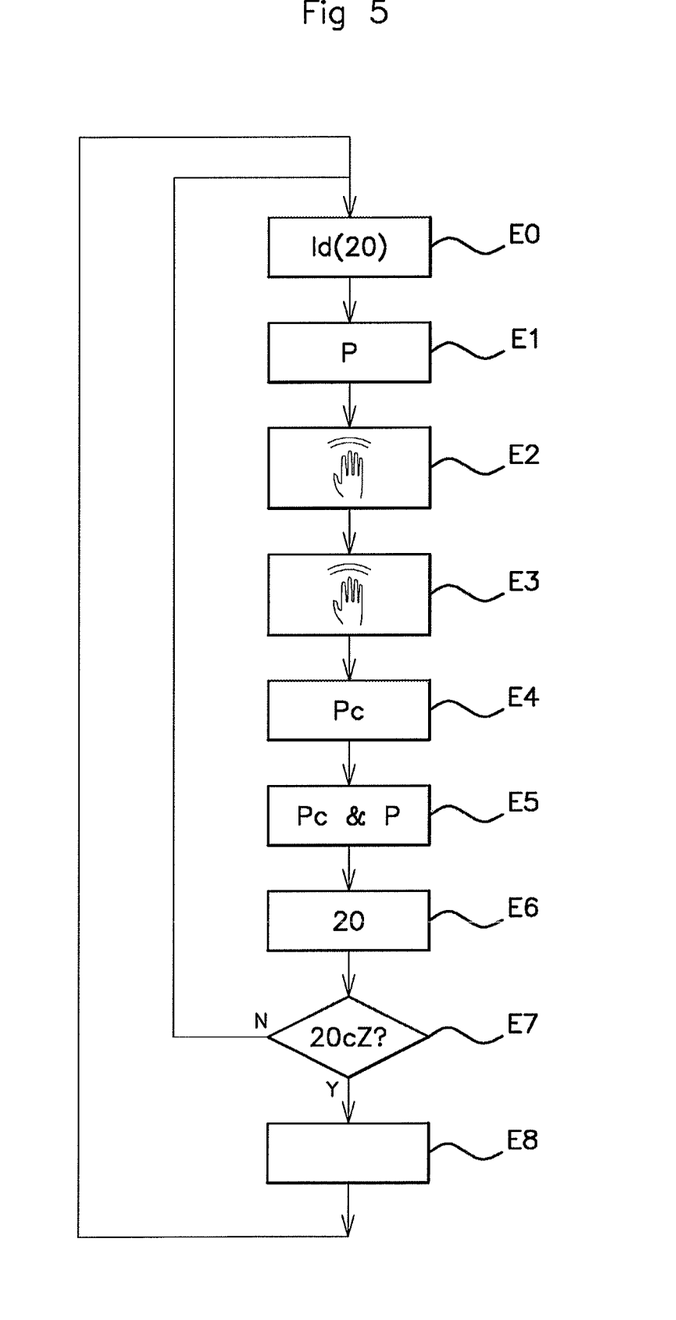
FIG. 5 schematically illustrates one embodiment of the method according to an aspect of the invention.

An aspect of the invention will now be described in one exemplary embodiment with reference to FIGS. 4 and 5. The method for activating a function will be described in the case of signal strength measurements performed by the transceiver modules 102 on signals transmitted by the access device 20 and received by the transceiver modules 102 and of reception of such a signal by each transceiver module 102, which then performs the signal strength measurement. As a variant, the access device 20 could measure the signal strength of signals received from the transceiver modules 102 itself and send these measurements to the transceiver modules 102 or to the dedicated computer 120, possibly with, for each received signal, an identifier of the transceiver module 102 that transmitted it, so that the dedicated computer 120 performs the position calculations through triangulation.

In this example, the method first of all comprises a step E0 of authenticating the access device 20 of the user with the vehicle 10. To this end, the access device 20 transmits an authentication signal comprising its identifier. Such a signal is received by one or more transceiver modules 102 and/or one or both communication devices 140, and is transmitted to the main computer 110 by way of the dedicated computer 120, allowing the access device 20 to be authenticated.

Once it has been authenticated, the access device 20 continues to exchange signals with the transceiver modules 102.

These signals are received by the transceiver modules 102 with a received signal strength P value that varies depending on the distance between the access device 20 and the transceiver module 102 and nearby human presence or lack thereof.

Each transceiver module 102, and possibly the transceiver modules of the communication devices 140, measure the signal strength P value of the received signal in a step E1.

When the user possessing the access device 20 brings his hand toward the handle of the driver's door of the vehicle 10, the presence detector 103 of the detection device 100 installed in said door detects the hand of the user in a step E2 and informs its associated transceiver module 102 (i.e. of the same detection device 100) of this. As described above, with reference to FIG. 4, when the detector 103 of one of the detection devices 100 detects human presence close to said detection device 100, the associated transceiver module 102 is denoted "main module" 102-1. Similarly, all of the transceiver modules 102 of the other detection devices 100 (i.e. which have not detected human presence) are denoted "secondary modules" 102-2.

In parallel, the detection device 100 comprising said presence detector 103 also transmits the item of information in relation to the detection of the presence of the hand to the main computer 110 in a step E3.

In a first embodiment, when it has been informed of the detection of a hand on the handle, the main module 102-1 calculates, in a step E4, a compensated signal strength value $P_C$ from the signal strength P measurement performed in step E1. This compensated signal strength value $P_C$ preferably corresponds to the measured received signal strength value plus a predetermined signal strength value. In the example of FIG. 3, the predetermined signal strength value required to compensate the signal strength value subject to interference corresponds to a value of +8 dB.

The main module 102-1 then transmits the compensated value $P_C$ to the dedicated computer 120 responsible for the Bluetooth® functions in a step E5.

Moreover, the secondary modules 102-2 and the transceiver modules of the communication devices 140 also transmit the received signal strength P value of the signal, measured in step E1, to the dedicated computer 120 in this same step E5.

The present example describes a calculation of the compensated signal strength value $P_C$ by the main module 102-1. However, alternatively, the main module 102-1 could very well also transmit the actual measured received signal strength P value to the dedicated computer 120 so that it calculates the compensated signal strength value $P_C$ itself.

Once it has received all of the received signal strength P values and it has the compensated signal strength value $P_C$, the dedicated computer 120 determines the position of the access device 20 through triangulation in a step E6.

The dedicated computer 120 then determines whether the access device 20 is situated within the predetermined proximity zone Z, for example less than 1 meter away from the handle of the door, in a step E7. When the access device 20 is situated within this predetermined proximity zone Z, the dedicated computer 120 sends the main computer 110 a detection message of detection of the access device 20 in the predetermined proximity zone Z. As a variant, it will be noted that the determination of the position of the access device 20 and/or the determination of the presence of the access device 20 within the predetermined proximity zone Z could be performed by the main computer 110.

When the main computer 110 has received both this detection message and the presence detection message sent in step E3, it unlocks the opening elements of the vehicle 10 in a step E8.

It will be noted that, in another embodiment, the signal strength measurements could be performed by the access device 20, and the signals sent by each transceiver module 102 may comprise an identifier of said transceiver module 102. In this case, the access device 20 associates each signal strength measurement of each received signal with said identifier and transmits these signal strength measurements to the dedicated computer 120 or to the main computer 110 so that it determines the position of the access device 20 (ignoring the signal strength measurements of the signals attenuated by the presence of the hand of the user on the handle or compensating said signal strength measurements).

The method according to an aspect of the invention makes it possible to limit or even eliminate the risks of errors linked to the determination of the position of the access device 20 in relation to the vehicle 10, thus making it possible in particular to ensure unlocking of the opening elements of the vehicle 10 when a user in possession of the access device 20 places his hand on or close to a handle of the vehicle 10.

The invention claimed is:

1. A method for activating a function of a vehicle from a portable access device borne by a user, said vehicle comprising a plurality of detection devices, each detection device comprising a presence detector, an antenna and an associated transceiver module able to communicate with the access device over an ultra-high-frequency communication link via said antenna, said transceiver module being electrically connected to an on-board computer in the vehicle, said method comprising:
    authenticating the access device by the vehicle,
    measuring the received signal strength of signals exchanged between the access device and the transceiver modules,
    detecting, by one of the detectors, of human presence, the transceiver module associated with said detector then being called "main module" and the other transceiver modules being called "secondary modules",
    sending, to the computer, by the detection device comprising the main module, a human presence detection message,
    sending, to the computer, by each detection device comprising a secondary module, the signal strength measurement performed between the access device and said secondary module,
    receiving, by the computer, the signal strength measurements sent by the secondary modules and of the human presence detection message,
    determining, by the computer, a position of the access device from the received signal strength measurements,
    activating a function of the vehicle when the computer has received the detection message and the position of the authenticated access device is determined as being within a predetermined proximity zone around the vehicle,
wherein the signal strength measurement performed between the access device and the main module is either compensated or ignored.

2. The method as claimed in claim 1, further comprising calculating, by the main module, a compensated signal strength value from the signal strength measurement performed between the access device and said main module and:
    sending, to the computer, by the detection device comprising the main module, said compensated value,
    receiving, by the computer, said compensated value,
    the computer then using this compensated value and the measurements received from the secondary modules to determine the position of the access device, the activation of a function of the vehicle being performed only when the computer has received the detection message and the position of the authenticated access device is determined as being in a predetermined proximity zone around the vehicle.

3. The method as claimed in claim 1, said method further comprising sending, to the computer, by the detection device comprising the main module, the signal strength measurement that is performed and, when the computer has received the detection message, calculating, by the computer, a compensated signal strength value based on the signal strength measurement received from the main module, the computer then using this compensated value and the measurements received from the secondary modules to determine the position of the access device.

4. The method as claimed in claim 2, wherein the compensated value corresponds to a sum of the signal strength measurement performed between the access device and the main module and a predetermined value.

5. The method as claimed in claim 1, wherein the signal strength measurements are performed by the access device.

6. The method as claimed in claim 1, wherein the signal strength measurements are performed by the transceiver modules.

7. The method as claimed in claim 1, wherein the position of the access device is determined through triangulation using the signal strength measurements received by the computer.

8. The method as claimed in claim 1, wherein the access device (20) communicates with each of the transceiver modules over a Bluetooth® communication link.

9. A motor vehicle comprising:
a plurality of detection devices, each detection device comprising:
a presence detector,
an antenna and
an associated transceiver module able to communicate over an ultra-high-frequency communication link via said antenna with an access device associated with the vehicle and borne by a user, said transceiver module being able to measure or to receive a received signal strength measurement of signals exchanged between said access device and said transceiver module, the transceiver module associated with a presence detector detecting human presence then being called "main module" and the other transceiver modules being called "secondary modules",
said detection device being electrically connected to at least one on-board computer in the vehicle and being able to send a presence detection message to said computer, and
at least one computer electrically connected to the plurality of detection devices and able to:
authenticate the access device,
receive a detection message from one of the detection devices,
receive signal strength measurements sent by the transceiver modules,
determine a position of the access device from the received signal strength measurements,
activate a function of the vehicle following the reception of a detection message and when the position of the authenticated access device is determined as being within a predetermined proximity zone around the vehicle,
wherein one or the other of the main module or the computer is able to compensate or to ignore the signal strength measurement performed between the access device and the main module.

10. A system for activating a function of a vehicle, comprising a vehicle as claimed in claim 9 and an access device borne by a user of the vehicle, able to authenticate itself with said vehicle and to communicate with the transceiver modules of the detection devices over an ultra-high-frequency communication link.

11. The method as claimed in claim 3, wherein the compensated value corresponds to a sum of the signal strength measurement performed between the access device and the main module and a predetermined value.

* * * * *